Sept. 29, 1953    W. A. HASBANY    2,653,689
PARKING BRAKE FOR AUTOMOTIVE VEHICLES
Filed Jan. 20, 1951    4 Sheets-Sheet 1
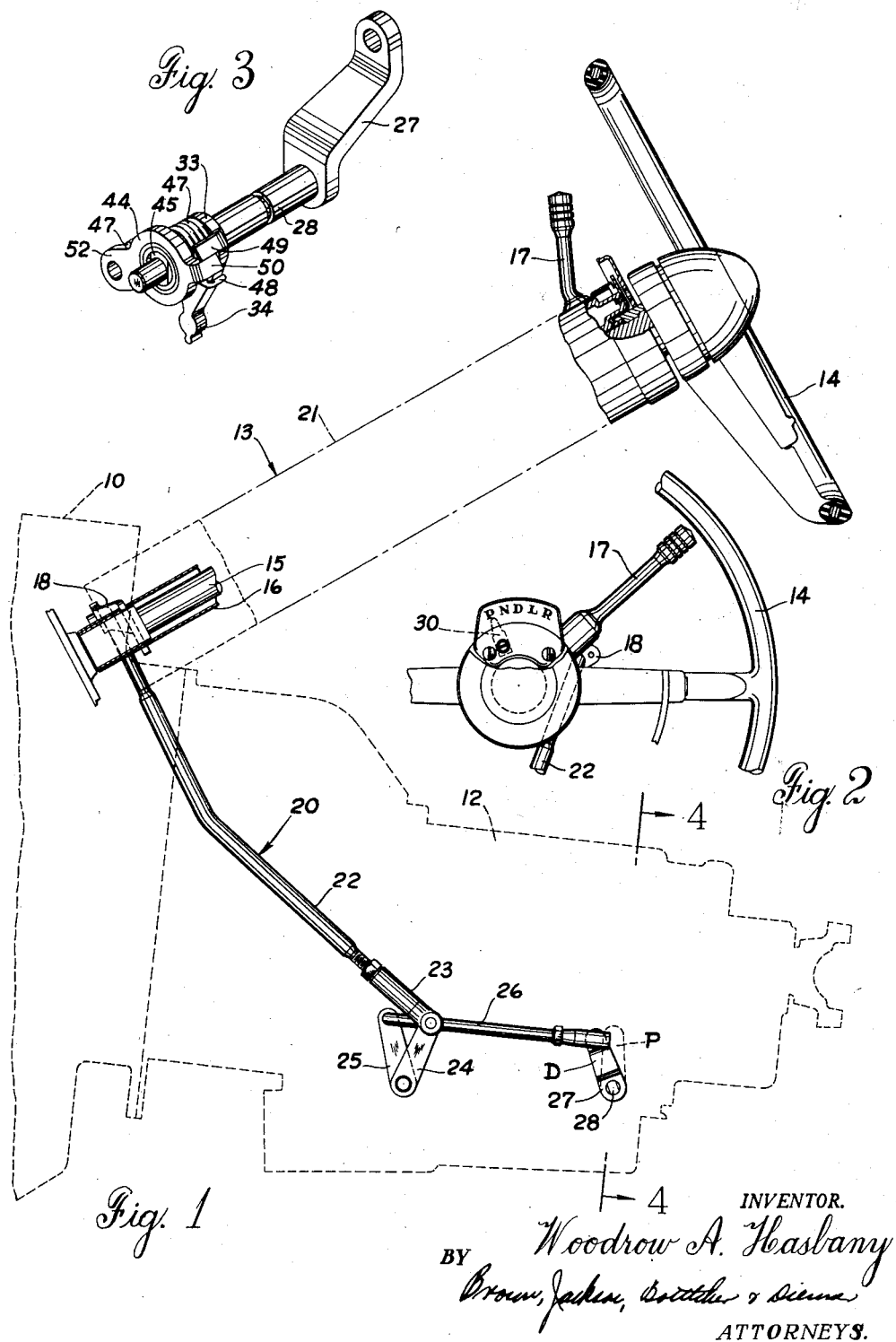

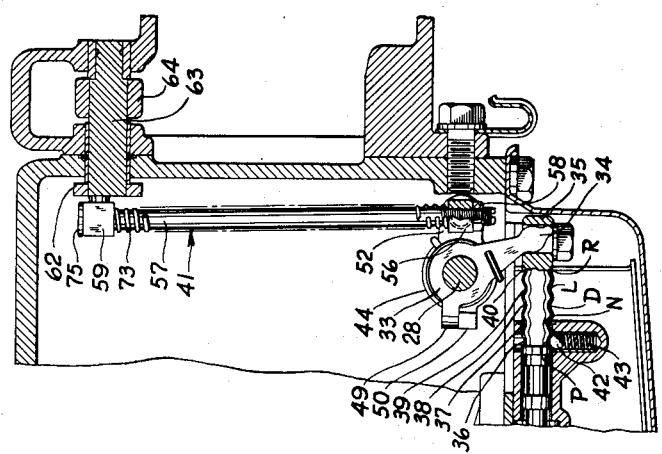
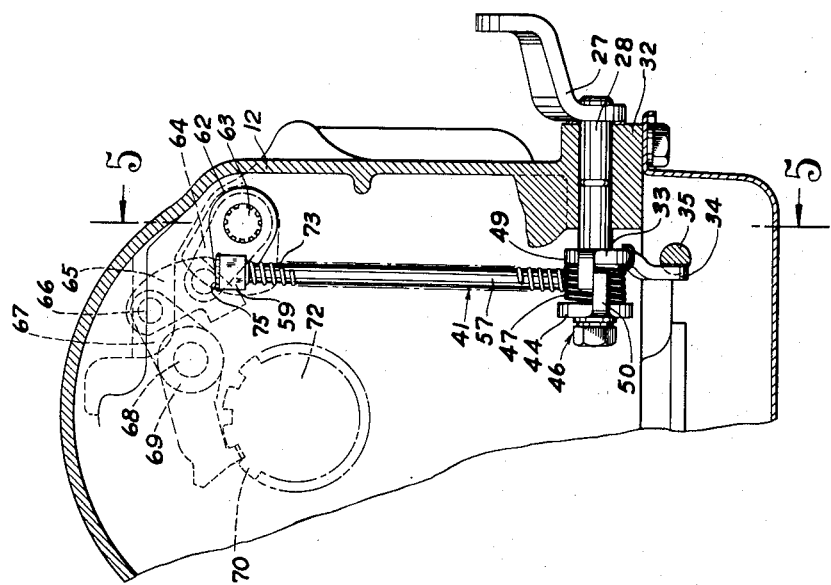

INVENTOR.
Woodrow A. Hasbany
BY
Brown, Jackson, Boettcher & Dienner
ATTORNEYS.

Sept. 29, 1953 W. A. HASBANY 2,653,689
PARKING BRAKE FOR AUTOMOTIVE VEHICLES
Filed Jan. 20, 1951 4 Sheets-Sheet 4

INVENTOR.
Woodrow A. Hasbany
BY
ATTORNEYS.

Patented Sept. 29, 1953

2,653,689

UNITED STATES PATENT OFFICE 2,653,689

PARKING BRAKE FOR AUTOMOTIVE VEHICLES

Woodrow A. Hasbany, South Bend, Ind., assignor to The Studebaker Corporation, South Bend, Ind., a corporation of Delaware Application January 20, 1951, Serial No. 207,030

2 Claims. (Cl. 192—4)

1

My present invention relates to a parking brake for automotive vehicles and the like.

In my copending application, Serial No. 131,411, filed December 6, 1949, I have shown a parking lock-up construction adapted for use with the output shaft of a transmission for holding it against rotation and thereby hold the propeller shaft of a vehicle in which the transmission is mounted, whereby the parking lock-up construction serves to provide a parking brake for the vehicle.

The parking lock-up mechanism of my copending application, above referred to, comprises essentially a ratchet or toothed wheel fixed to the output shaft of the transmission, and with which a manually selectively operable pawl is provided for engagement with the ratchet or toothed wheel to hold the same against rotation, to thereby provide a parking brake for a vehicle. The construction referred to has utility for use in an automatic transmission in which a selector lever is provided adjacent the upper end of the steering column and below the steering wheel of the vehicle, and in which the selector lever is adapted to be disposed in certain selected positions to effect the desired operation of the transmission, that is, for driving the vehicle in either forward or reverse or selected drive ranges, and conveniently this selector lever may be utilized so that by manipulation thereof the pawl of the parking brake mechanism may be disposed to its operative position, with respect to the ratchet, to provide a parking brake for the vehicle. It has been found that in a parking brake mechanism, as above described, on occasion, especially when the vehicle is parked on an incline extending either forwardly or rearwardly, that the output shaft is under load which tends to bind or retain the ratchet in engagement with the pawl, preventing the ready disengagement of the pawl from the ratchet by movement of the manually operable selector lever disposed below the steering wheel. In other words, free movement of the pawl away from the ratchet is impeded by the load on the propeller or output shaft of the transmission, and sufficient leverage to effect disengagement of the pawl from the ratchet cannot be effected by manipulation of the selector lever without endangering or damaging the connecting linkage or other parts.

It is an object of my invention to provide a parking lock-up mechanism of the character indicated having means operable, upon application of torque to the transmission output shaft, to release the locked or binding relation between the

2 ratchet and pawl, which may occur in instances as above referred to, so as to avoid the above discussed and other objections of presently known constructions.

In order to achieve the aforesaid object, I propose to provide improved linkage means between the pawl and the manually operable selector lever, disposed, for example, below the steering wheel of a vehicle, having means for permitting positioning of the manually operable drive selector to a position for effecting actuation of the transmission to drive the vehicle either forward or reverse, and in which linkage means, upon actuation of the drive selector as indicated, includes biasing means adapted to be loaded to urge the pawl in a direction away from the ratchet, whereby, upon imposition of torque on the transmission output shaft, the ratchet frees the pawl so that the loaded biasing means disposes the pawl to disengaged position.

The above and other objects and advantages of my invention will appear from the detail description.

Now, in order to acquaint those skilled in the art with the manner of constructing and utilizing a parking lock-up mechanism in accordance with my present invention, I shall describe, in connection with the accompanying drawings, a preferred embodiment of my invention.

In the drawings:

Figure 1 is a diagrammatic side elevational view showing a typical arrangement of parts including a steering column and steering wheel of an automotive vehicle, a manually operable drive selector lever, suitable linkage for effecting a selected condition of operation of the transmission of the vehicle, and for actuation of the parking brake of the character to which my invention pertains;

Figure 2 is a partial plan view of the steering wheel and the manually operable drive selector lever shown in Figure 1, with a portion of the steering wheel being broken away;

Figure 3 is a perspective view of a portion of the parking brake means of my invention, which is associated with the linkage connecting the manually operable drive selector lever with the selector rod for controlling actuation of the transmission;

Figure 4 is a vertical sectional view taken substantially along line 4—4 of Figure 1, looking in the direction indicated by the arrows, and showing the positions of the parts of my parking brake construction when the brake is applied;

Figure 5 is a vertical sectional view taken substantially along line 5—5 of Figure 4, looking in the direction indicated by the arrows;

Figure 7:
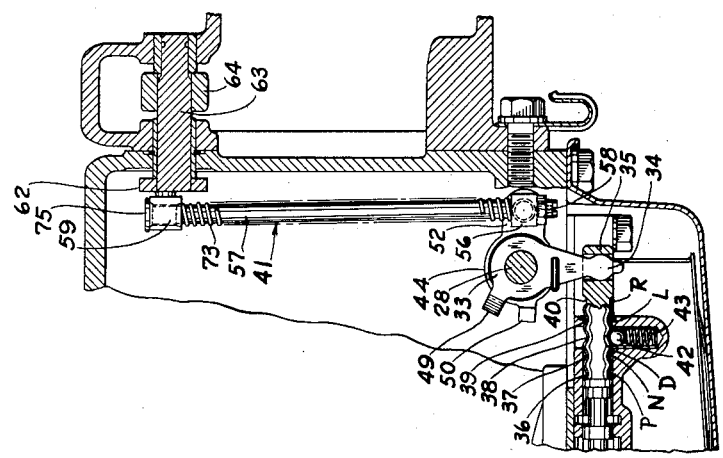
Figure 7 is a detail vertical sectional view taken substantially along the line 7—7 of Figure 6, looking in the direction indicated by the arrows.

Referring now to Figure 1 of the drawings, I have diagrammatically shown a general arrangement of certain parts of an automobile, with which my present invention may be embodied, comprising, for example, an internal combustion engine 10 and associated transmission means 12, which are incorporated in the usual way in the vehicle, and which further includes a steering column 13 at the upper end of which a hand steering wheel 14 is mounted in the usual way. The steering wheel 14 has connection with a steering shaft 15, which extends through a tubular shell 16 having connection at its upper end with a manual drive selector lever 17 and at its lower end to a lever 18 forming part of a linkage means, indicated generally at 20, and extending to the transmission. The coaxially extending steering shaft 15 and selector shaft 16 are, in turn, contained within a hollow column 21, which extends from immediately below the steering wheel to the floor of the vehicle. The linkage 20 further comprises a rod member 22 pivotally connected, in the conventional manner, to the lever 18 at one end and at its other end to an adjustable turn buckle 23 having pivotal connection to a crank arm 24, which, in turn, has connection with a crank arm 25, and the latter with a rod 26 extending to and having pivotal connection with the outer end of a crank arm 27. The crank arm 27 lies closely adjacent the side of the transmission 12 and is made fast to a shaft 28, which extends into the transmission casing.

The selector lever 17, as best shown in Figure 2, is adapted to be manually disposed to five positions by the operator of the vehicle. These five positions are indicated by the letters P—N—D—L and R, and a finger, shown at 30, indicates to the driver of the vehicle the position of the selector lever 17. Position P indicates the position for applying the parking brake of the vehicle; position N indicates neutral for the transmission; position D—forward drive through the transmission; position L—a second forward drive through the transmission; and, finally, R indicating reverse for the transmission. The positions D, L, and R are typical driving condition positions of an automatic transmission, with D position providing for automatic acceleration of the vehicle by manipulation of the accelerator pedal, as is well known, and the position L being a selective position for use by the operator to maintain the transmission in a high ratio drive, as, for example, in climbing hills, and with, of course, the R position being for purposes of providing for reverse drive to the vehicle.

The parking brake mechanism of my present invention is embodied with the transmission control so that the parking brake may be applied by manipulation of the manually operable selector lever 17 to dispose it in position P, and positions D, L, and R, as will presently appear, provide for effecting application of torque to the output shaft of the transmission and to effect release of the parking brake under certain conditions which may arise in operating the vehicle to be hereinafter described.

Referring now particularly to Figures 3, 4, and 5, it will be observed that the shaft 28, which has the crank arm 27 fixed thereto at the end of the shaft, projecting outwardly of the transmission, is journaled in a boss portion 32 of the transmission housing and has a shift lever 33 made fast thereto. The shift lever 33, as best shown in Figure 5, is formed with an end portion 34 projecting into an opening formed at one end of a transmission selector rod 35 so that, upon movement of the linkage 20 by the manually operable drive selector lever 17, rectilinear sliding movement of the selector rod 35 may be effected. The rod 35 extends to a hydraulic control means for the transmission for effecting control of the transmission, for purposes of establishing either of the four conditions previously represented and defined by the letters N, D, L, and R. The selector rod, as shown, is provided with a plurality of grooves, indicated at 36 through 40, and with which grooves the ball detent, comprising a ball bearing 42, spring loaded by a coil spring 43, is adapted to engage selectively, with the groove 36 being comparable to the P position, groove 37 to the N position, groove 38 to the D position, groove 39 to the L position, and groove 40 to the R position. Thus, upon rocking of the shaft 28 by manipulation of the manual selector drive lever 17, the selector rod 35 may be disposed in any of its aforementioned selected positions by means of the shift lever 33.

The parking brake mechanism of my invention includes suitable linkage means, indicated generally at 41, extending between shaft 28 and a pawl 69, and comprises an arm member 44 journaled on the shaft 28 by means of a suitable bearing or bushing, best shown in Figure 3 at 45, and is retained, as illustrated in Figure 4, adjacent the inner projecting end of the shaft 28 by a nut and washer, indicated generally at 46. A torsion spring 47 is mounted about the shaft 28 to lie between the shift lever 33 and the arm 44, with the spring being formed with end portions 47 and 48 which are adapted to engage edges of the arm member 44 and shift lever 33, respectively. It will be observed that the shift lever 33 is provided with a lug 49 extending toward arm member 44, and that the arm member 44 is provided with an integral lug 50 projecting toward shift lever 33, with the lugs being disposed in positions to engage with each other. The aforementioned coil spring 47 is prestressed so as to normally urge the shift lever 33 and arm 44 toward each other to engage the projecting lugs 49 and 50 thereof together. The arm 44, as best shown in Figures 3 and 5, is provided with a projecting portion 52, opposite the lug 50 thereof, which carries a pivotal threaded connector 56 to receive the threaded end of the rod 57, which is secured by means of a nut 58. The upper end of the rod has sliding or lost motion connection with a connector 59 which, as shown, is pivotally connected to the outer end of a crank arm 62, made fast to a shaft 63 which carries a second crank arm 64. The crank arm 64, in turn, has pivotal connection to a link 65, which, in turn, is pivotally connected at 66 to one end of a crank arm 67 journaled on the shaft 68. The crank arm 67 has a pawl 69 formed integrally therewith, which is adapted to have engagement with a ratchet 70 carried by the output shaft 72 of the transmission for the vehicle. A coil spring 73 is disposed about the rod 57 and extends between the pivot blocks or connectors 56 and 59, carried, respectively, by the arm 44 and the crank arm 62.

In applying the parking brake, the projecting lug 49 of the shift lever 33 engages the projecting lug 50 of the arm 44, upon shifting of the manually operable drive selector lever 17 to P position. Thus, for example, upon movement of the manually operable selector lever 17 from its N position to P position, the shift lever 33, as viewed in Figure 5, is rotated in a counterclockwise direction which effects counterclockwise rotation of the arm 44. This movement of shift lever 33 shifts the shift rail 35 to locate groove 36, opposite the spring ball detent 42. The rotative force thus imparted to the arm 44 effects the upper vertical movement of rod 57, as viewed in Figure 5, placing the spring 73 under compression and permitting relative sliding movement between the upper end of the rod 57 with respect of the pivotal connector or block 59. Spring 73, when thus loaded, effects rocking of crank arm 62 in a clockwise direction, as viewed in Figure 4, which, through shaft 63, crank arm 64, link 65, shaft 68, and crank arm 66, effects counterclockwise rotation of pawl member 69 to engage it with the ratchet 70 and thereby brake the output shaft of the transmission. The pawl is thus disposed to its operative brake applying position by means of the loaded spring 73, and should the pawl not be accurately aligned with a tooth space of the ratchet, the pawl, by virtue of its spring loading, may ride over the ratchet until alignment is effected. The output shaft 72 of the transmission, as is conventional, has connection to the propeller shaft of the automotive vehicle and, hence, in the position of the parts last described, engagement between the pawl 69 and ratchet 70 serves to brake the vehicle.

Figure 6:
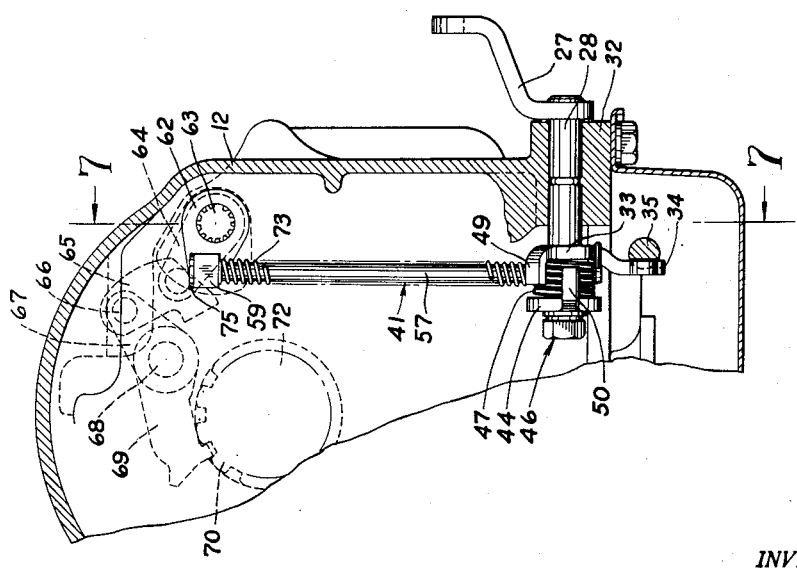
Figure 6 is a vertical sectional view along the lines of Figure 4, but showing the positions of the parts of the parking brake construction of my invention when the pawl is in binding engagement with the ratchet and with the selector lever positioned to effect forward drive through the transmission, and immediately prior to imposition of torque on the transmission output shaft.
Figure 9:
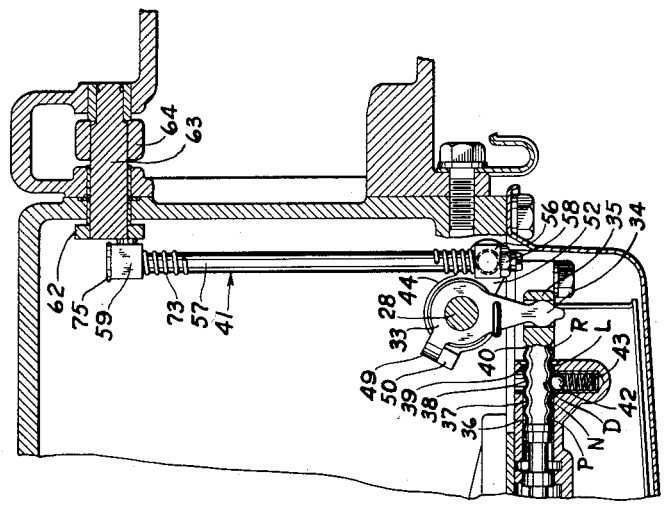
Figure 9 is a vertical sectional view taken substantially along line 9—9 of Figure 8, looking in the direction indicated by the arrows.
Figure 8:
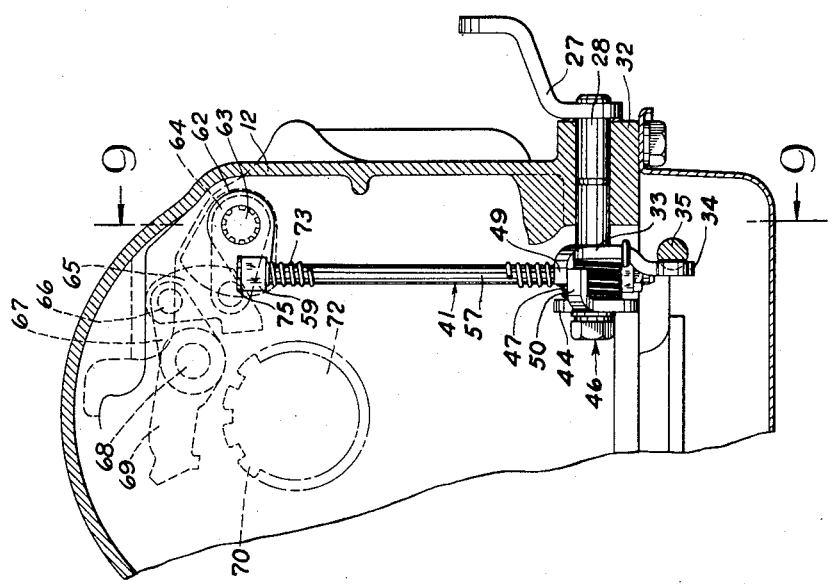
Figure 8 is a vertical sectional view along the lines of Figures 4 and 6, and showing the positions of the parts of my parking brake construction with the brake released or disengaged.

Assuming now that the parking brake is applied with the vehicle parked on an incline so that it tends to roll backwardly and in which the load of the vehicle imparts a binding force through the propeller shaft to the output shaft of the transmission to bind the ratchet and pawl together, it will be observed, as shown in Figures 6 and 7, that the manually operable selector lever 17 may be shifted, as, for example, to D position in which the ball detent engages in groove 38 in the end of the transmission shift rod 35. The lost motion connection between the upper end of rod 57 and the bearing block or connector 59 provides for limited relative movement of the rod 57 with respect of the lever arm 62 and engagement of the enlarged flanged end 75 of rod 57 with the bearing block or connector 59 prevents the journaled arm member 44 from following the shift lever 33. The coil spring 73 is relieved, but torsion spring 47, tending to rotate the arm member 44 in a clockwise direction, is caused to be loaded to effect a downward bias on rod 57. Now, with the transmission conditioned to effect drive to the vehicle, depression of the accelerator by the driver of the vehicle provides for application of torque to the output shaft of the transmission, and this torque tends to release binding engagement between the pawl 69 and the ratchet 70, created by the car load torque under the condition above assumed, and when this occurs, the loaded torsion spring 47 rotates the arm member 44 clockwise, as viewed in Figure 7, so that the lug 50 engages the lug 49 of the shift lever 33, whereupon the linkage between the arm member 44 and the pawl 69 is disposed to its retracted or nonengaged position, as shown in Figures 8 and 9.

In a situation in which the car is parked on an incline so that it tends to roll forwardly, the manually operable selector lever 17 is shifted to R, or reverse drive position, so that reverse torque from the transmission is utilized to offset the car load torque on the pawl and ratchet means.

It will be observed that the sliding connection provided between the bearing block or connector 59 at the end of the crank arm 62 for the rod 57 enables disposition of the manually operable drive selector lever 17 from the P position, even though the ratchet and pawl 69 and 70, respectively, may be held together under the load of the vehicle. Thereafter, actuation of the transmission to effect the transmittal of torque to the output shaft of the transmission provides for disengagement of the ratchet and pawl under the influence of loaded torsion spring 47, and with the construction providing for disposal of the locking pawl to its inoperative position. It will be further observed that the torsion spring 47, between the shift lever 33 and the arm 44, may be additionally loaded by shifting of the shift rail to either the L position or the R position to increase the force of the torsion spring 47 in effecting disposal of the locking pawl 69 to its retracted position.

In conclusion, it will be observed, therefore, that I have provided a construction in which the operator may manually manipulate the manually operable drive selector lever 17 while the pawl and ratchet are in binding engagement, without straining any parts of the linkage mechanism, in order to enable release of the parking brake by application of torque to the output shaft of the transmission.

While I have shown and described what I consider to be a preferred embodiment of my invention, it will be understood that various modifications and rearrangements may be made therein without departing from the spirit and scope of my invention.

I claim:

1. A parking brake lock-up mechanism for use with a shift lever secured to a shaft for rotation therewith and in which the shift lever is adapted to have engagement with a selector rod of a transmission having an output shaft comprising a ratchet secured to said output shaft, a pawl for engaging said ratchet to brake said output shaft, linkage means between said pawl and said shift lever of said selector means comprising arm means mounted for movement relative to said shift lever, co-engaging lug means on said arm means and said shift lever whereby said shift lever in one direction of rotation thereof effects rotation of said arm means, first spring means between said shift lever and said arm means to bias them normally to engage the lugs thereof with each other, a rod having pivotal connection with said arm means, a crank arm associated with said pawl for effecting movement thereof toward and away from said ratchet, said rod member having lost motion connection with said crank arm, second spring means extending between said arm means and said crank arm adapted to be compressed in said one direction of rotation of said shift lever and said arm means for urging said crank arm in a direction to engage said pawl with said ratchet, and said lost motion connection of said rod with said crank arm providing upon binding engagement of said pawl with said ratchet and upon rotation of said shift lever in the opposite direction for relieving said second spring means and for loading said first spring means so that upon application of torque to said output shaft said first spring is adapted to dispose said pawl to disengaged position with respect to said ratchet.

2. A parking brake lock-up mechanism for use with a shift lever secured to a shaft for rotation therewith and in which the shift lever is adapted to have engagement with a selector rod of a transmission having an output shaft comprising a ratchet secured to said output shaft, a pawl for engaging said ratchet to brake said output shaft, linkage means between said pawl and said shift lever of said selector means comprising a shaft, a first arm member secured to said shaft, a second arm member journaled on said shaft and axially spaced from said first arm member, co-engaging lug means on said first and second arm members whereby said shift lever in one direction of rotation thereof effects rotation of said second arm member through said first arm member and said shaft, first spring means between said first and second arm members to bias them normally to engage the lugs thereof with each other, a rod having pivotal connection with said second arm member, a crank arm associated with said pawl for effecting movement thereof toward and away from said ratchet, said rod member having lost-motion connection with said crank arm, second spring means arranged concentrically about said rod member and extending between said second arm member and said crank arm, said second spring means being adapted to be compressed in said one direction of rotation of said shift lever and said second arm means for urging said crank arm in a direction to engage said pawl with said ratchet, and said lost-motion connection of said rod with said crank arm providing upon binding engagement of said pawl with said ratchet and upon rotation of said shift lever in the opposite direction for relieving said second spring means and for loading said first spring means so that upon application of torque to said output shaft said first spring means is adapted to dispose said pawl to disengaged position with respect to said ratchet.

WOODROW A. HASBANY.

References Cited in the file of this patent

UNITED STATES PATENTS

| Number | Name | Date |
|---|---|---|
| 1,719,157 | Wilson | July 2, 1929 |
| 2,038,983 | Browne | Apr. 28, 1936 |

FOREIGN PATENTS

| Number | Country | Date |
|---|---|---|
| 974,256 | France | Sept. 27, 1950 |
| 324,086 | Great Britain | Jan. 20, 1930 |

OTHER REFERENCES

Publications: Modern Automatic Transmissions, Chilton Co., part V, October 23, 1950; Product Engineering, McGraw Hill, pages 96–102, February 1948.